(12) United States Patent
Higano et al.

(10) Patent No.: US 6,948,217 B2
(45) Date of Patent: Sep. 27, 2005

(54) SINGLE-SHAFT HINGE DEVICE COMPRISING A PLURALITY OF TORQUE-GENERATING SECTIONS

(75) Inventors: Sakae Higano, Saitama (JP); Hitoshi Sato, Tokyo (JP); Hiroaki Kato, Ichihara (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 121 days.

(21) Appl. No.: 10/415,800

(22) PCT Filed: Nov. 8, 2001

(86) PCT No.: PCT/JP01/09793

§ 371 (c)(1),
(2), (4) Date: May 2, 2003

(87) PCT Pub. No.: WO02/38970

PCT Pub. Date: May 16, 2002

(65) Prior Publication Data

US 2004/0025299 A1 Feb. 12, 2004

(30) Foreign Application Priority Data

Nov. 10, 2000 (JP) ........................................ 2000-343600
Oct. 18, 2001 (JP) ........................................ 2001-320317

(51) Int. Cl.[7] .............................................. F16C 11/10
(52) U.S. Cl. ....................... 16/303; 379/433.13; 455/90; 16/341
(58) Field of Search .......................... 16/303, 328–330, 16/334, 332, 285, 340–342; 455/90, 550, 556, 575; 379/433.11–433.13; 361/680–683

(56) References Cited

U.S. PATENT DOCUMENTS

| | | | | |
|---|---|---|---|---|
| 5,109,572 A | * | 5/1992 | Park ............................. | 16/334 |
| 5,259,019 A | * | 11/1993 | Stilley ..................... | 455/575.3 |
| 5,274,882 A | * | 1/1994 | Persson ........................ | 16/303 |
| 5,799,371 A |   | 9/1998 | Lin | |
| 5,906,010 A |   | 5/1999 | Suzuki | |
| 5,970,819 A |   | 10/1999 | Katoh | |
| 5,996,132 A | * | 12/1999 | Sorimachi ...................... | 4/236 |
| 6,070,298 A | * | 6/2000 | Sorimachi ..................... | 16/330 |
| 6,115,886 A | * | 9/2000 | Fujita .......................... | 16/330 |
| 6,305,050 B1 | * | 10/2001 | Imai ............................ | 16/303 |
| 6,389,611 B2 | * | 5/2002 | Fujita ........................... | 4/236 |
| 6,785,936 B2 | * | 9/2004 | Koshikawa ................... | 16/328 |
| 6,789,292 B2 | * | 9/2004 | Oshima et al. ............... | 16/297 |

FOREIGN PATENT DOCUMENTS

| | | |
|---|---|---|
| DE | 198 54 493 | 6/2000 |
| JP | 60-24929 | 2/1985 |
| JP | 03-125013 | 5/1991 |
| JP | 7-98011 | 4/1995 |
| JP | 9-112538 | 5/1997 |
| JP | 10-311327 | 11/1998 |
| JP | 2000-22790 | 1/2000 |

\* cited by examiner

*Primary Examiner*—Robert J. Sandy
*Assistant Examiner*—Andre L. Jackson
(74) *Attorney, Agent, or Firm*—Flynn, Thiel, Boutell & Tanis, P.C.

(57) ABSTRACT

A single-shaft hinge component is provided that can be made durable, of small size and light weight. The single-shaft hinge device is made up of a plurality of torque-generating sections wherein, a single-shaft hinge is formed of a single shaft 1, rotary cams 3 fitted onto this shaft 1 that are capable of rotation about the shaft 1 and axially moving on the shaft, fixed cams 4 fitted on the shaft 1 that are capable of axially moving on the shaft but incapable of relative rotation with respect to the shaft, and elastic members 5 arranged coaxially with the shaft 1 and that cause abutment of side faces of the rotary cam 3 and the fixed cam 4 against each other, the rotary cams 3 and fixed cams 4 being arranged coaxially with the single shaft 1 so that abutment of the rotary cam 3 and fixed cam 4 is achieved at their side faces at two or more locations.

9 Claims, 10 Drawing Sheets

SINGLE-SHAFT HINGE DEVICE COMPRISING A PLURALITY OF TORQUE-GENERATING SECTIONS

TECHNICAL FIELD

The present invention relates to a single-shaft hinge component employed in the folding section of small electronic devices such as cellular phones, notebook computers, personal digital assistants or DVD monitors.

BACKGROUND ART

In practically all existing types of single-shaft hinges, a resin or metal cam and a coil spring or plate spring are assembled as a single set and rotary frictional torque is generated in a condition with two cam sets in pressure contact (for example Japanese Patent Application Publication No. 10-311327 and Japanese Patent Application Publication No. 2000-22790).

In recent years, as increasing importance has been attached to ease of operation and feeling during rotation, there has been a strong demand for hinge components with highly precise torque value control, durability capable of withstanding some hundreds of thousands of operations, smaller size and lighter weight and reduced cost.

In conventional products, rotary frictional torque is generated solely by pressure contact of a pair of a fixed cam and rotary cam, so, typically the restoring force of the spring would be increased in order to satisfy demands for smaller size and lighter weight and to generate larger rotary torque than conventionally.

However, in cam portions that have been made of very small size to meet such demands for size reduction, a higher surface pressure than conventionally must be borne in this very small area, so inevitably a material of excellent wear resistance and components of high dimensional precision become necessary.

Consequently, conventional hinge components had the drawback that when there were variation in the wear resistance or dimensions, this resulted in severe variability of the torque value or aging deterioration (frictional wear) of the cam section, causing a lowered torque value or failure.

DISCLOSURE OF THE INVENTION

The problem that the invention is intended to solve is to provide a single-shaft hinge component of high durability capable of being made of small size and light weight in cellular phones or notebook computers for which smaller size and lighter weight are required.

Specifically, the present invention are as follows:

(1) A single-shaft hinge device comprising a plurality of torque-generating sections wherein a single-shaft hinge comprises a single shaft, rotary cams fitted on this shaft and that are capable of axially moving on the shaft and capable of rotating with respect to the shaft about an axis of the shaft, fixed cams fitted on the shaft and that are capable of axially moving on the shaft but incapable of relative rotation with respect to the shaft, and elastic members arranged coaxially with the shaft and that bring side faces of each adjacent rotary cam and fixed cam into contact to form abutment faces thereof, wherein the abutment faces of the rotary cams and fixed cams are provided at two or more locations on the single shaft. In such a single-shaft hinge device, a high rotary sliding torque can be obtained by means of an elastic member of weak restoring force.

(2) The single-shaft hinge device comprising a plurality of torque-generating sections set forth in the above (1), wherein a plurality of the rotary cams and fixed cams are arranged coaxially with the shaft so as to abut both ends of the elastic members, a well-balanced frictional force being thereby generated at both ends of the elastic member and the durability being improved without abnormal irregular wear of the rotary cams and fixed cams.

(3) The single-shaft hinge device comprising a plurality of torque-generating sections set forth in claim 1, wherein a plurality of the rotary cams and fixed cams are coaxially arranged with respect to the shaft such that one end of each elastic member abuts a face opposite to the abutment face of the rotary cam or fixed cam, whereby the number of components can be reduced and costs lowered by using both side faces of the single rotary cam or fixed cam as abutment faces.

(4) The single-shaft hinge device comprising a plurality of torque-generating sections set forth in the above (1), wherein in a combination of the respective inventions of the above (2) and (3), arrangement is made coaxially on the shaft, whereby a versatile combination can be achieved wherein, for example, well-balanced frictional forces can be generated at both ends of the elastic members while the number of components can be reduced and costs lowered.

(5) The single-shaft hinge device comprising a plurality of torque-generating sections set forth in any of the above (1) to (4), wherein there are provided concave/convex sections and flat sections on the abutment faces of the rotary cams and fixed cams for causing the torque to change with angle of rotation, whereby, by combination of the convex sections or concave sections, a pivotally attached component can be held in stable fashion at a prescribed angle of rotation or by a force like a click stop action pulling into a prescribed angle in a prescribed angular range is obtained and a stable energizing force of the elastic member is achieved by the flat abutment faces without causing irregular load, whatever the angle of rotation.

(6) The single-shaft hinge device comprising a plurality of torque-generating sections set forth in the above (1) to (4), wherein a flat face for generating a constant torque irrespective of angle of rotation is formed on one or on mutual abutment faces of the rotary cam or the fixed cam, whereby the shaft can be stopped at any desired angle.

(7) The single-shaft hinge device comprising a plurality of torque-generating sections set forth in any of the above (1) to (6), wherein an abutment face is formed on one side face or both side faces of the rotary cam or the fixed cam, whereby the shaft can be stopped at any desired angle and providing abutment faces on both sides of the rotary cam or fixed cam, whereby abnormal irregular wear can be prevented and stable rotary torque obtained by generating well-balanced frictional force.

(8) The single-shaft hinge device comprising a plurality of torque-generating sections set forth in any of the above (1) to (7), wherein it comprises a bracket fixed to one of the rotary cam or the fixed cam and/or shaft and another bracket fixed to one of the fixed cam and/or shaft or the rotary cam, the one bracket and the other bracket being respectively fixed to the pivotally attached component, whereby the pivotally attached component can be held at any desired angle of rotation by means of the cams and brackets.

(9) The single-shaft hinge device comprising a plurality of torque-generating sections set forth in any of the above (1) to (7), wherein a joining member is engaged with a co-operating pivotally attached component at both ends of the shaft; although it is convenient for arranging the single-shaft hinge device in the vicinity of the end of the rotary shaft if a flange is provided only at one end of the shaft, if, according to the present invention, flanges are provided in the vicinity of both ends of the shaft, this is convenient in that arrangement can be achieved substantially in the middle part of the rotary shaft, making it possible to ensure a stable action.

BEST MODE FOR CARRYING OUT THE INVENTION

A preferred mode for carrying out the present invention is described below with reference to the drawings.

Figure 1:
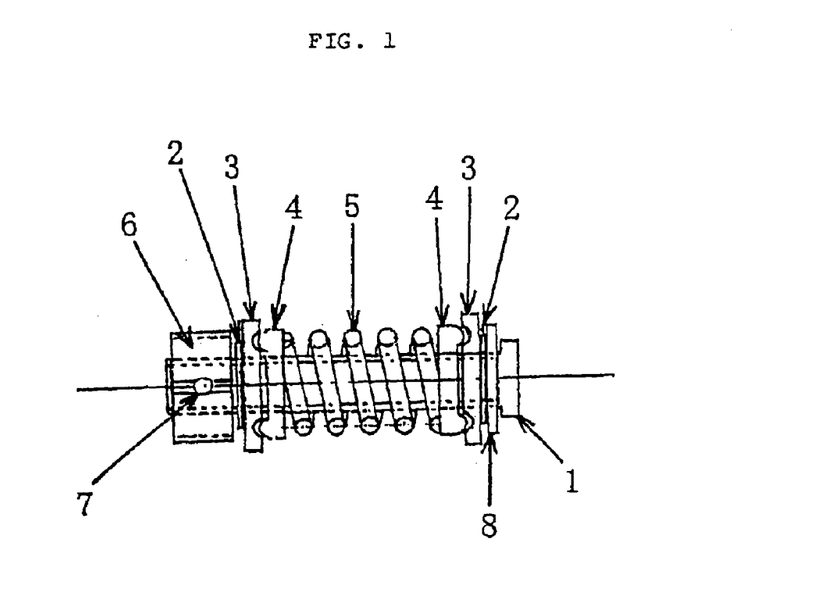
FIG. 1 is a front view of an embodiment of the invention according to claim 1.
Figure 2:
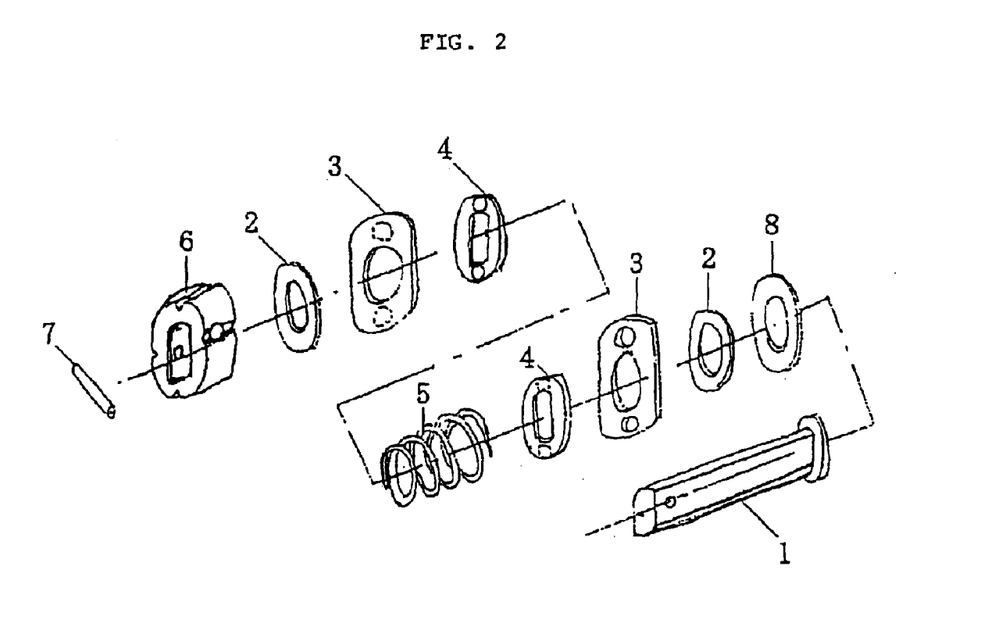
FIG. 2 is an exploded perspective view of FIG. 1.

FIG. 1 is a front view of an embodiment of the invention according to claim 1 and FIG. 2 is an exploded perspective view of FIG. 1. A retaining flange is formed at the right-hand end of a shaft 1 and near the left-hand end thereof there is provided a pin hole into which is inserted a spring pin 7 for fixing purposes. A joining member 6 is fitted at the left-hand end of the shaft, this joining member 6 being fixed to the shaft 1 by this insertion of the spring pin 7 through the pin hole. The external circumferential shape of the shaft 1 is oval-shaped, with part thereof being cut parallel with the axis. Although an example is illustrated in which the cross-sectional shape of the shaft 1 employed in the present invention is oval-shaped, the cross-sectional shape could be rectangular or elliptical or of other shape and an E ring or caulking or other similar means could be employed instead of the flange or pin retaining element for fixing of the ends. Also, as the method of processing the shaft, resin molding, die casting, cutting or cold pressing or other similar techniques could be adopted; as the material thereof, a suitable choice may be made in accordance with the hinge performance from resin, metal or other material.

2 is a resin spacer of excellent lubricating properties; 3 is a rotary cam with concave sections provided in one face thereof and another face thereof being planar, provided with a hole in the middle thereof allowing the shaft to be inserted therethrough in rotatable fashion; 4 is a fixed cam having convex sections on one face thereof and another face thereof being planar, having the shaft 1 passing therethrough and being fitted onto the oval-shaped external circumference of the shaft cross-section, being slidable along the shaft and rotating together with the shaft; 5 is a coil spring constituting an elastic member that generates rotary frictional torque by applying pressure-contacting force to the rotary and fixed cams; 6 is a joining member, 7 is a spring pin for fixing the joining member 6 to the shaft 1 and 8 is a stop plate.

The joining member 6 is fixed to the shaft 1 by means of the spring pin 7 and a concave/convex section comprising a mechanism for preventing rotation with respect to a pivotally attached component is provided at the circumference of the flange 6. The hinge device according to this embodiment, as shown in FIG. 2, is therefore completed by driving the spring pin 7 into the hole provided in the flange 6 and shaft 1 as the final assembly step.

Two pairs of cams i.e. the rotary cams 3 and the fixed cams 4 are set in position at both ends of the coil spring 5 with a single shaft 1 passing therethrough. FIG. 1 shows the condition in which this rotary cam 3, which has concave sections, and the fixed cam 4, which has convex sections, are arranged to generate rotary frictional torque by pressure contact force being applied thereto by the coil spring 5. It should be noted that the positions in which the rotary cam 3 and the fixed cam 4 are assembled could be interchanged. If this is done, the coil spring 5 is arranged to press against the face opposite the abutment face of the rotary cam. For the rotary cam 3 and fixed cam 4, a material is selected having excellent resistance to friction, such as metal, resin or ceramic.

FIG. 1 shows the mechanism in a condition in which the concave sections and convex sections of the rotary cam 3 and fixed cam 4 are in coincidence and the coil spring 5 is in an engaged (click) relationship; this engaged condition occurs every time rotation takes place through an angle of 180°. On further rotation of the shaft, the engaged condition is eliminated and a shift takes place to a condition in which a fixed rotary frictional torque is generated with the convex sections of the fixed cam 4 and the flat sliding face of the rotary cam 3 in a condition of pressure contact. For example in a condition when employed in an electronic device, for example a so-called "free stop" condition is realized in which the angle of the inclination of the cover produced by shaft rotation by opening/closing of the cover containing the monitor can be stopped at any desired angle.

Figure 3:
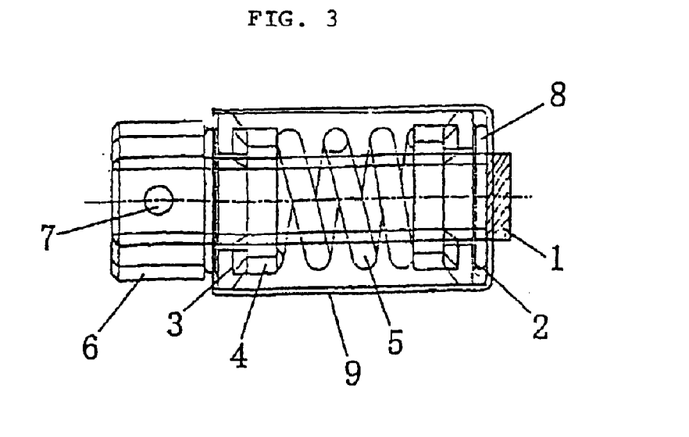
FIG. 3 is an internal transparent view of the front face of an embodiment of the invention according to claim 1.
Figure 4:
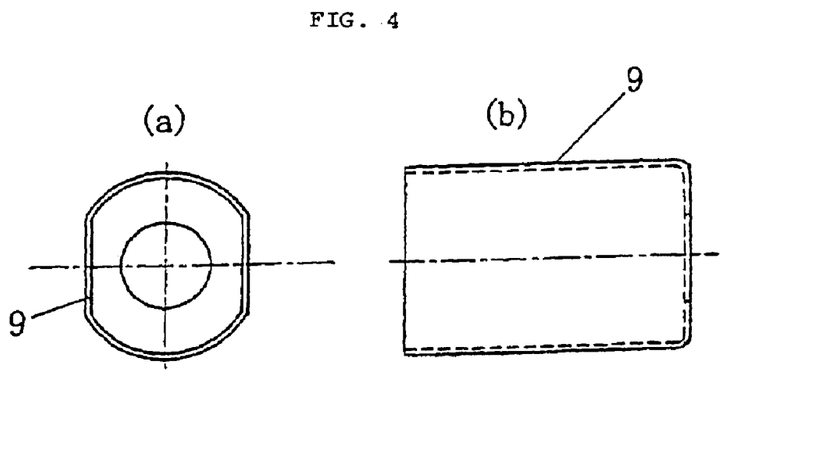
FIG. 4 shows a joining sleeve of FIG. 3, (a) being a left side view and (b) being a front view thereof.

FIG. 3 is a front view of another embodiment of the invention according claim to 1. Rotary cams 3 are connected by means of a joining sleeve 9 shown in FIG. 4 having an internal diameter that is substantially the same as the outer diameter of the rotary cams 3 and components such as the cams could also be enclosed within the sleeve. Thanks to the use of the joining sleeve 9, attachment of the main body onto the component that it co-operates with is simplified and ingress of foreign bodies can be prevented.

Figure 5:
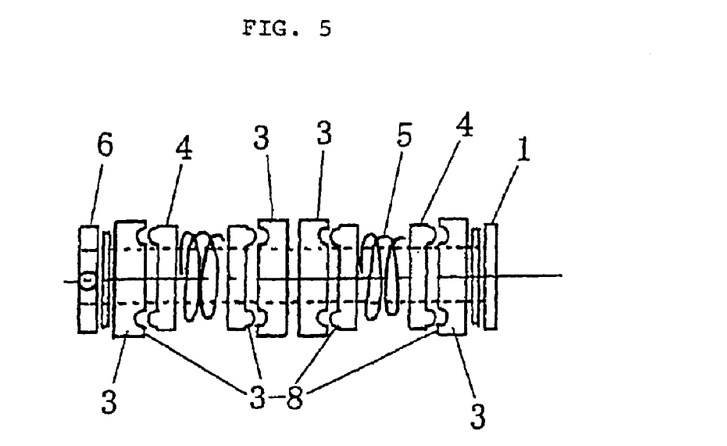
FIG. 5 is a front view of an embodiment of the invention according to claim 2.

FIG. 5 is a front view of an embodiment of the invention according to claim 2, consisting of a single-shaft hinge device having a construction in which a plurality (two in the case of FIG. 5) of assemblies constituted by fixed cams 4, arranged at both ends of each coil spring 5, and rotary cams 3, coupled with the. respective fixed cams 4, are set in position with a single shaft 1 passing therethrough. Pressure contacting force is applied to adjacent rotary cams 3 by abutment faces 3-8 of the fixed cams 4, so that rotary frictional torque is generated by relative rotation thereof. It should be noted that the positions of the rotary cams 3 and fixed cams 4 in the assemblies could be reversed.

Figure 6:
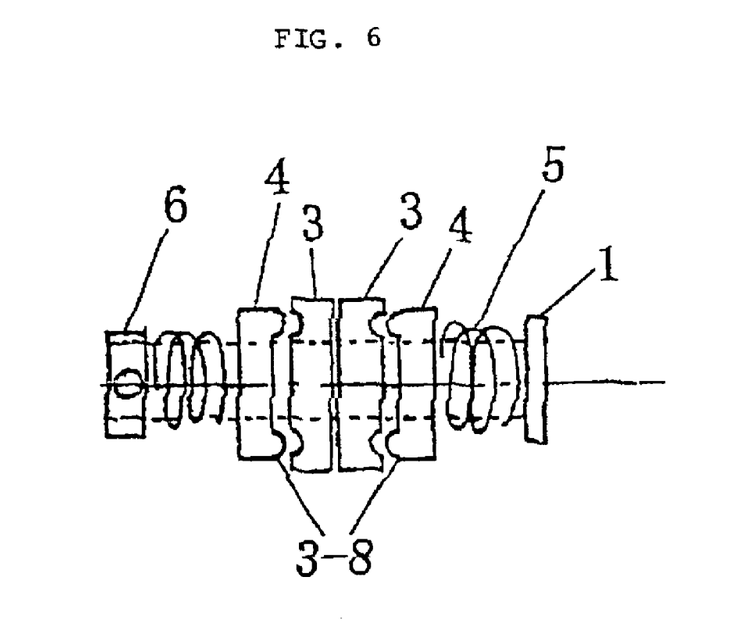
FIG. 6 is a front view of an embodiment of the invention according to claim 3.

FIG. 6 is a front view of an embodiment of the invention according to claim 3. Two rotary cams 3 are assembled with two fixed cams 4 with abutment faces 3-8 arranged to be in contact therewith, with pressure contacting force applied by coil springs 5 from both ends of a single shaft 1 passing therethrough.

Figure 7:
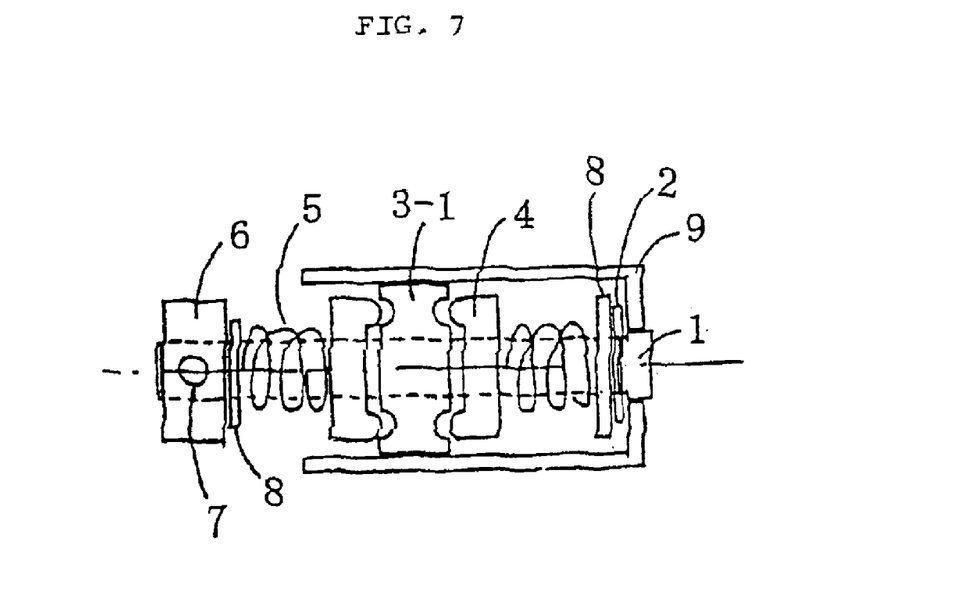
FIG. 7 is a front view of another embodiment of the invention according to claim 3.
Figure 8:
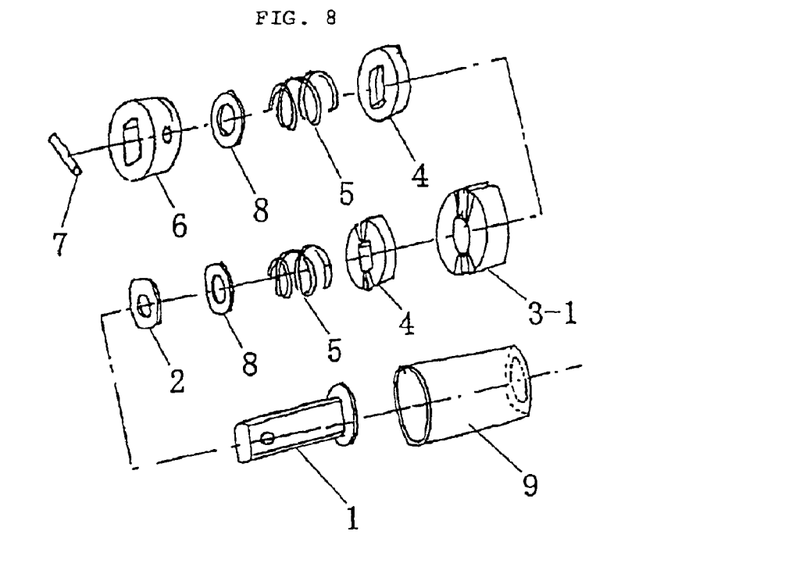
FIG. 8 is an exploded perspective view of FIG. 7.

FIG. 7 is a front view of another embodiment of the invention according to claim 3. FIG. 8 is an exploded perspective view of FIG. 7. Portions that are identical with those of FIG. 1 and FIG. 2 described above are given the same reference symbols. 3-1 is a rotary cam having concave faces on both side faces of the disc and formed with a hole through which is passed a shaft 1 in rotatable fashion; 9 is a joining sleeve having an internal diameter such as to fit and surround the outer circumference of the rotary cam 3-1 and that engages a retaining flange provided at the right-hand end of the shaft 1.

Figure 9:
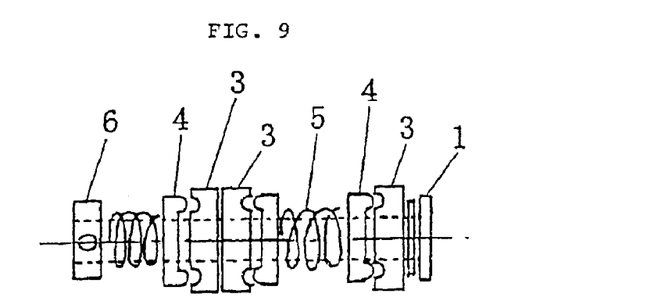
FIG. 9 is a front view of an embodiment of the invention according to claim 4.

FIG. 9 is a front view of an embodiment of the invention in which the inventions of claim 2 and claim 3 are combined on the axis of shaft 1 wherein a further combination of a fixed cam 4 and a rotary cam 3 is set in position at the right-hand end of the coil spring 5 on the right of the embodiment of FIG. 6.

Figure 10:
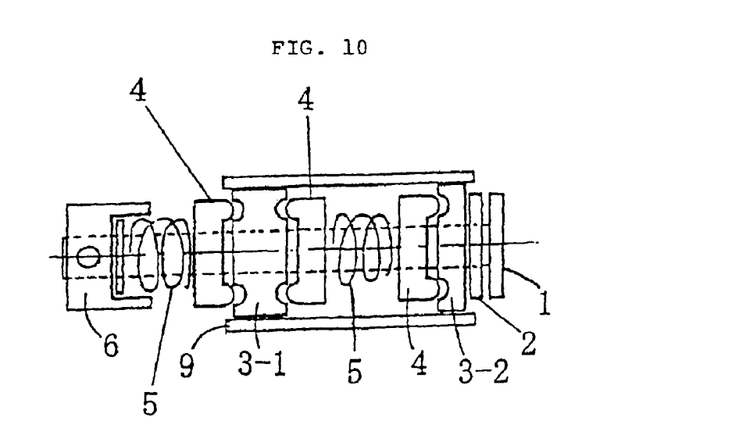
FIG. 10 is a front view of yet another embodiment of the invention according to claim 4.

FIG. 10 is a front view of yet a further embodiment of invention in which the inventions according to claim 2 and claim 3 are combined on the axis of the shaft 1. Sections for torque generation at two locations are formed by abutment of fixed cams 4 having convex sections at two locations with both sides of a rotary cam 3-1 having concave sections at two locations on both side faces; a further torque-generating section is formed by coupling a fixed cam 4 having convex sections with a rotary cam 3-2 having concave sections at two locations on its left side face, its right side face being flat at the right-hand end of the coil spring 5 on the right-hand side, thereby making a total of three torque-generating sections in all on the single shaft 1; and a joining sleeve 9 surrounding the outer circumferences of the rotary cam 3-1 and rotary cam 3-2 is provided. Thus, three torque-generating sections are formed by the two rotary cams 3-1, 3-2, the three fixed cams 4 and the two coil springs 5. Consequently, a single-shaft hinge device is provided wherein durability and stability of the torque value are greatly improved compared with the conventional device.

Figure 11:
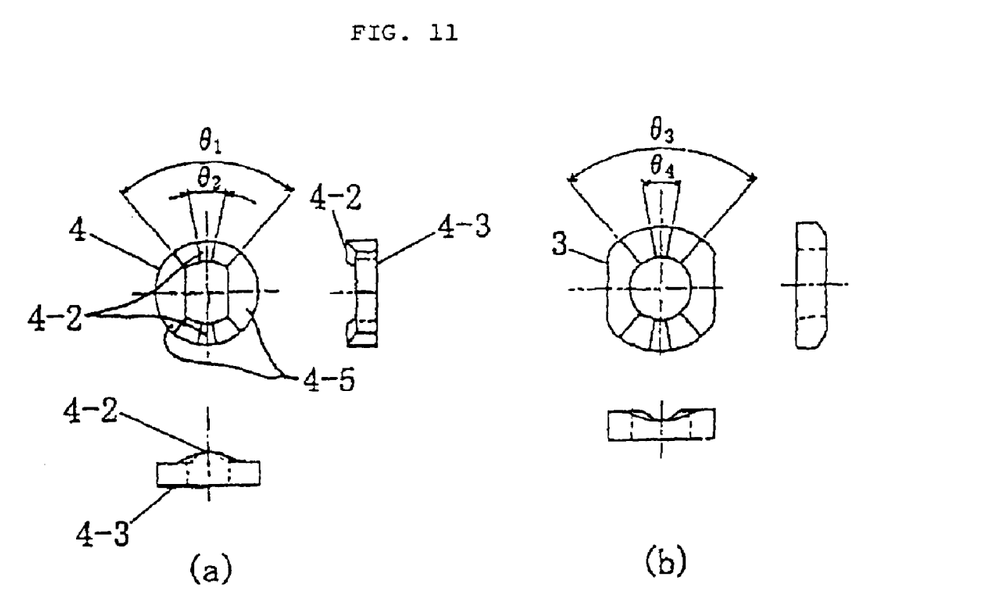
FIG. 11 shows an embodiment of a pair of cams employed in the invention according to claim 5, (a) being a fixed cam and (b) being a rotary cam.

FIG. 11 shows an embodiment of the invention according to claim 5, (a) being a plan view, front view and right-hand side view of a fixed cam 4; elevation of the convex sections 4-2 commences at an angle $\theta_1$ and the peak is at an angle $\theta_2$. The flat sections are 4-5. Also, the face on the opposite side is a planar face 4-3, constituting a contacting face with the coil spring 5 (see FIG. 1 to FIG. 10). FIG. 11(*b*) shows a plan view, front view and right-hand side view of the rotary cam 3 facing this fixed cam.

Figure 12:
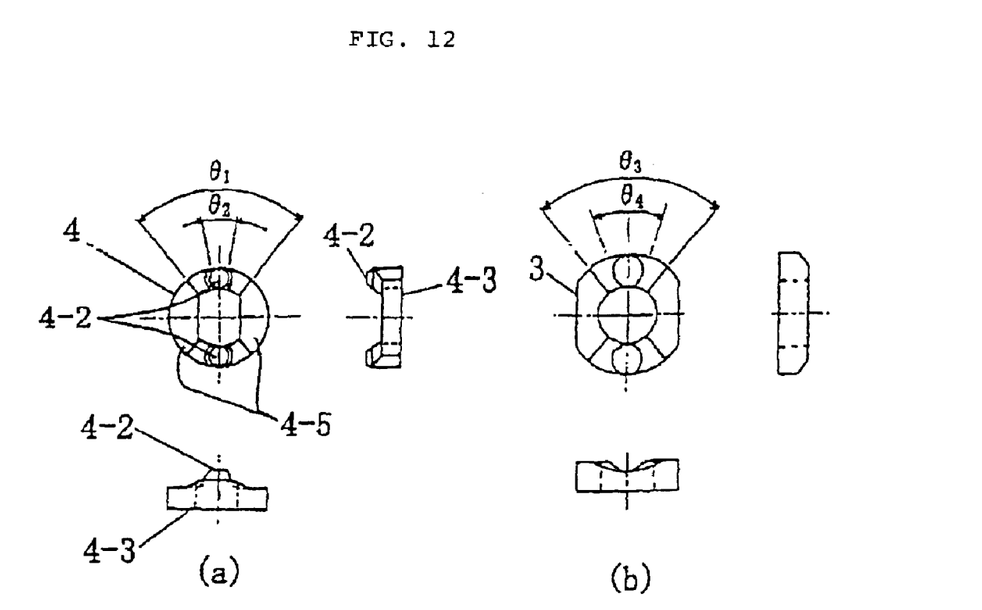
FIG. 12 shows another embodiment of a pair of cams employed in the invention according to claim 5, (a) being a fixed cam and (b) being a rotary cam.

FIG. 12 shows another embodiment of the invention according to claim 5 wherein the convex sections 4-2 of the fixed cam 4 are of rounded shape. FIG. 12(*b*) shows the rotary cam 3 facing this fixed cam.

Figure 13:
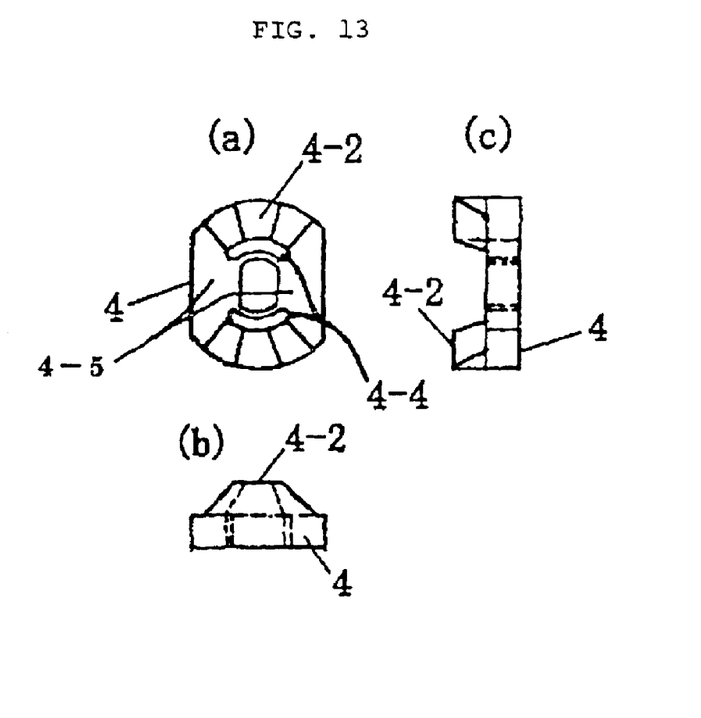
FIG. 13 shows yet another embodiment of a rotary cam employed in the invention according to claim 5, (a) being a plan view, (b) being a front view and (c) being a right side view.

FIG. 13 shows yet another embodiment of the invention according to claim 5 wherein lubrication between the rotary cam 3 and the fixed cam 4 in pressure contact with each other can be stabilized by providing holes 4-4 that accumulate lubricant such as grease.

Figure 14:
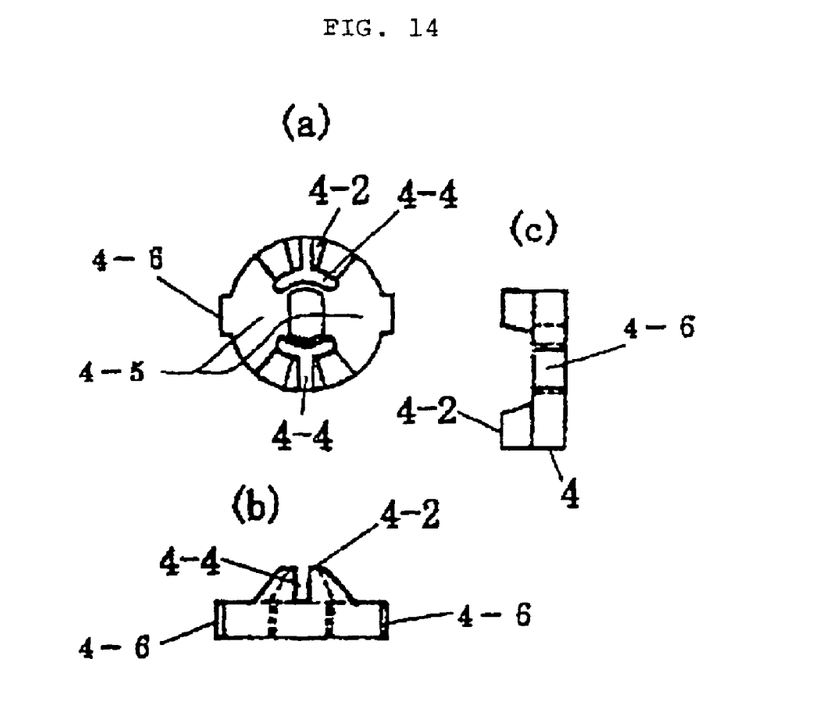
FIG. 14 shows yet another embodiment of a rotary cam employed in the invention according to claim 5, (a) being a plan view, (b) being a front view and (c) being a right side view.

FIG. 14 shows yet another embodiment of the invention according to claim 5 wherein mutual lubrication of the cams is stabilized by providing holes 4-4 that accumulate a lubricant such as grease in the fixed cam 4 and providing projecting sections 4-6 in the outer circumference of the fixed cam 4.

Figure 15:
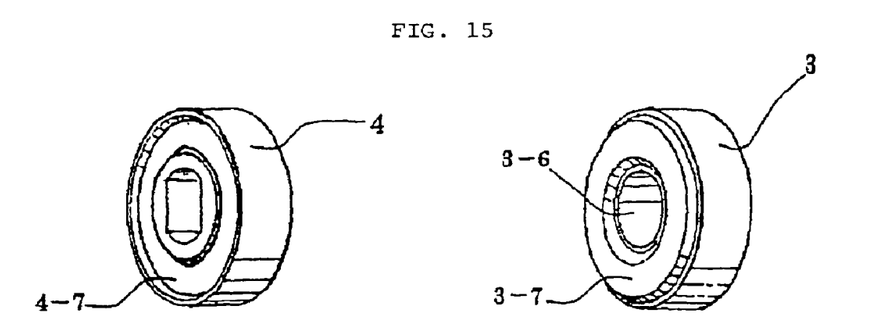
FIG. 15 is a perspective view of an embodiment of a pair of cams employed in the invention according to claim 6.

FIG. 15 is a perspective view showing an embodiment of the invention according to claim 6 wherein a round hole 3-6 is provided in the center of a rotary cam 3, a semi-cylindrical convex section 3-7 is formed at the circumference thereof, an oval hole is provided at the center of the fixed cam 4, and a semi-circular annular concave section 4-7 is formed at the circumference thereof. The annular concave section 4-7 is fit into the cylindrical convex section 3-7 to form slidable abutment faces. It should be noted that, in the reverse arrangement to that described above, it would be possible to form a semi-circular annular concave section on the rotary cam 3 and to form a semi-cylindrical convex section on the fixed cam.

Figure 16:
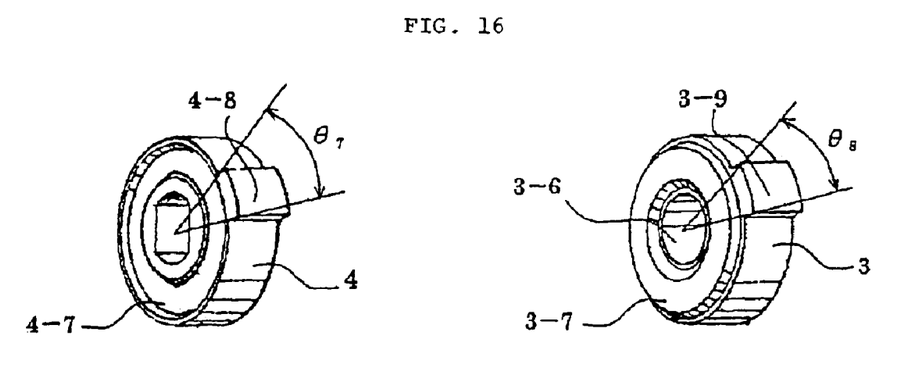
FIG. 16 is a perspective view of another embodiment of a pair of cams employed in the invention according to claim 6.

FIG. 16 is a perspective view showing another embodiment of the invention according to claim 6 wherein portions that are identical with those of FIG. 15 are given the same reference symbols and a limited-rotation region is provided in the range $360°-(\theta_7+\theta_8)$ of the rotary cam 3 by forming a projection 3-9 of angular width $\theta_8$ on the outer circumference of the rotary cam 3 and forming a projection 4-8 of angular width $\theta_7$ on the outer circumference of the fixed cam 4.

Figure 17:
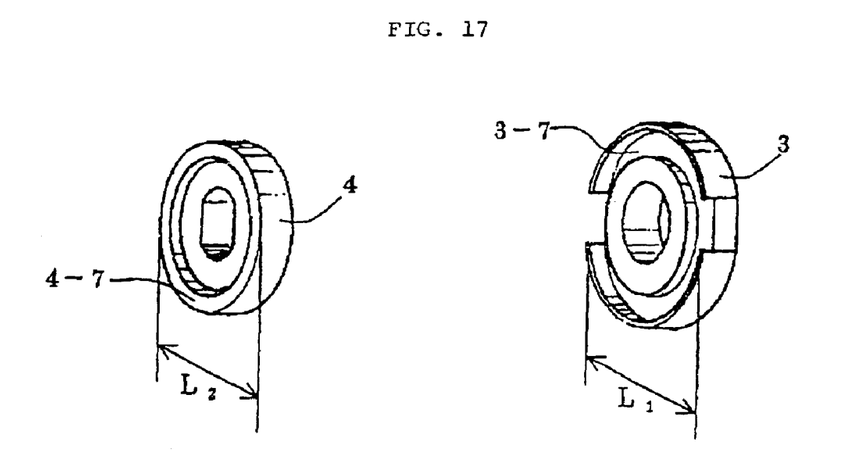
FIG. 17 is a perspective view of yet another embodiment of a pair of cams employed in the invention according to claim 6.

FIG. 17 is a perspective view of yet another embodiment of the invention according to claim 6 wherein portions that are identical with those of FIG. 15 are given the same reference symbols and wherein both sides of the outer circumference of the rotary cam 3 are cut in parallel shape. If the dimension between the cut faces of the rotary cam 3 is taken as L1 and the external diameter of the fixed cam 4 is taken as L2, it is necessary that L1 >L2.

Figure 18:
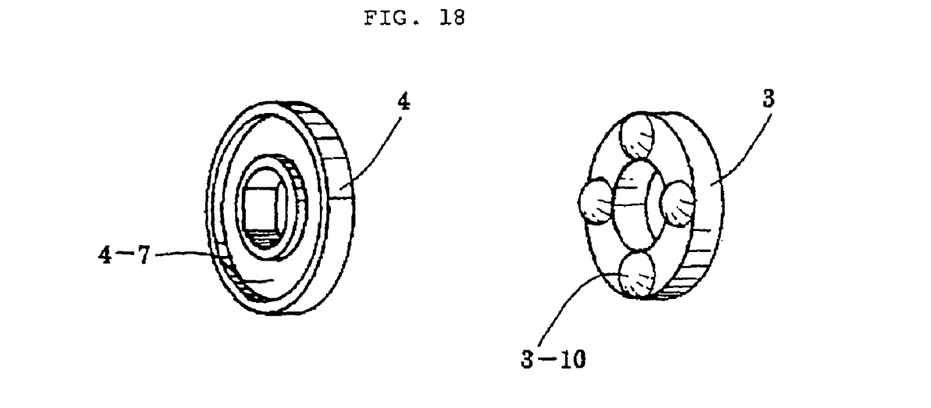
FIG. 18 is a perspective view of yet another embodiment of a pair of cams employed in the invention according to claim 6.

FIG. 18 is a perspective view of yet another embodiment of the invention according to claim 6 wherein portions that are identical with those of FIG. 17 are given the same reference symbols and wherein conical convex sections 3-10 are provided on the rotary cam 3.

Figure 19:
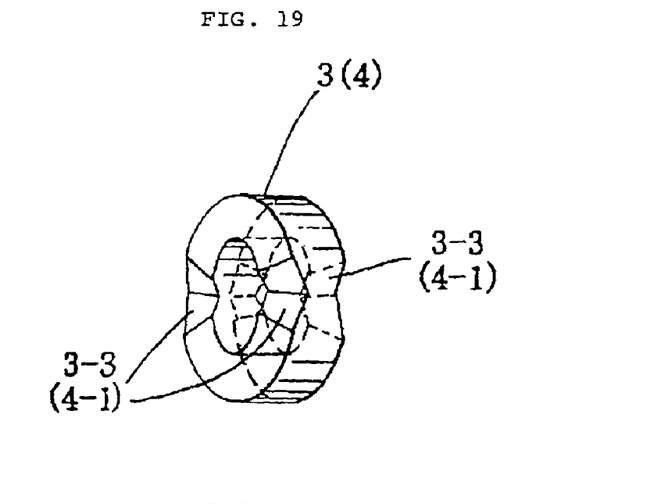
FIG. 19 is a perspective view of an embodiment of a rotary cam or fixed cam employed in the invention according to claim 7.
Figure 20:
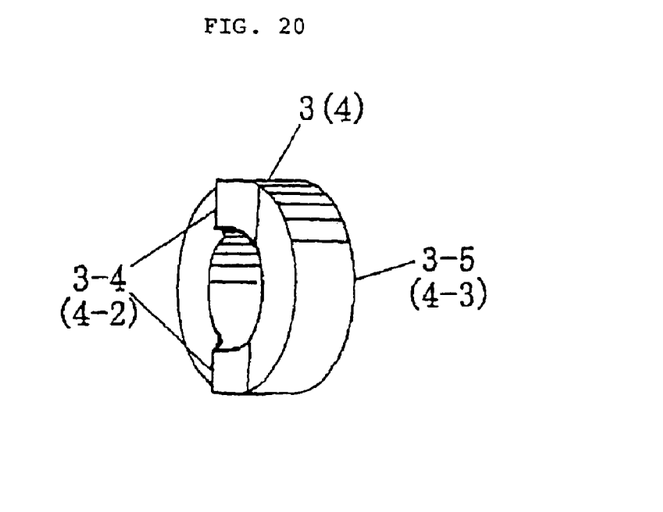
FIG. 20 is a perspective view of an embodiment of a rotary cam or fixed cam employed in the invention according to claim 7.

FIG. 19 and FIG. 20 are perspective views of an embodiment of the invention according to claim 7. In FIG. 19, diametrically concave sections 3-3 or concave sections 4-1 are formed on both side faces of the rotary cam 3 or fixed cam 4. In FIG. 20, diametrically opposite convex sections 3-4 or convex sections 4-2 are formed on both faces of a rotary cam 3 or fixed cam 4.

Figure 21:
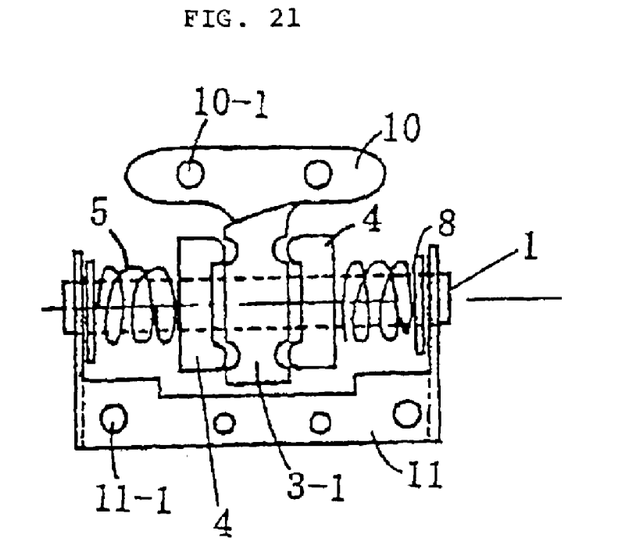
FIG. 21 is a front view of an embodiment of the invention according to claim 8.
Figure 22:
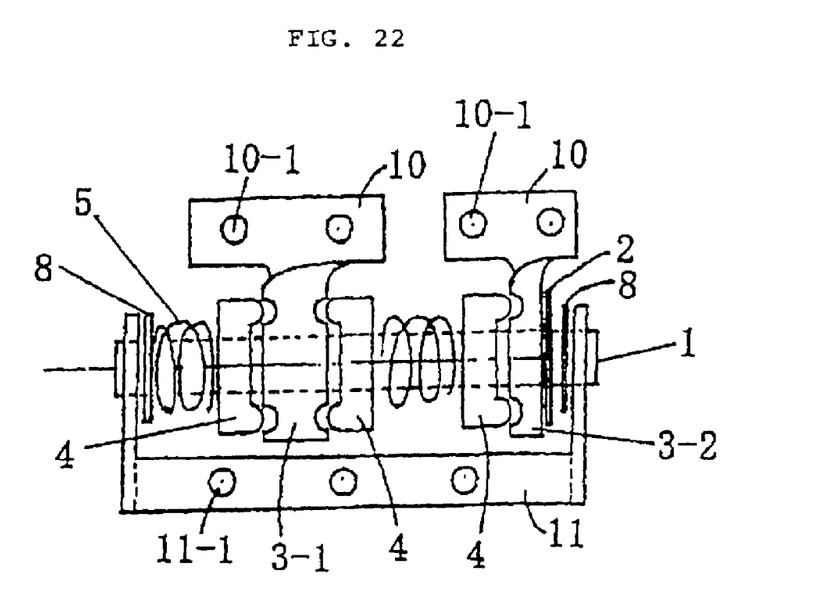
FIG. 22 is a front view of another embodiment of the invention according to claim 8.

FIG. 21 is a front view of an embodiment of the invention according to claim 8 and FIG. 22 is a front view of another embodiment of the invention according to claim 8. Portions that are identical with those of FIG. 7 or FIG. 10 are given the same reference symbols. On the rotary cam 3-1 of FIG. 21 or the rotary cams 3-1, 3-2 of FIG. 22, there is fixed a bracket 10 formed with holes 10-1 for fixing purposes and a bracket 11 in which there are provided holes 11-1 for fixing purposes is fixed to the shaft 1. The pivotally attached component such as the folding section of an electronic device can be held in position by an effect like a click stop function thereon at a prescribed angle by separately fixing the brackets 10 and 11 to the pivotally attached component.

Figure 23:
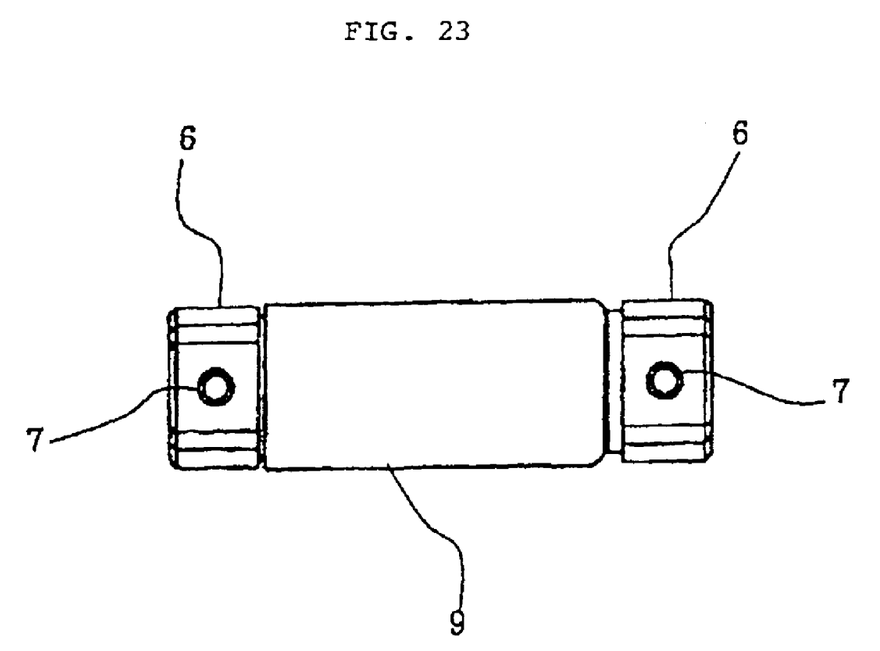
FIG. 23 is a front view of an embodiment of the invention according to claim 9.

FIG. 23 shows an embodiment of the invention according to claim 9. The interior of the joining sleeve 9 is not shown but its construction is identical with the interior of the joining sleeve of FIG. 3. Joining members 6 are fixed by spring pins 7 at both ends of the shaft. Also, the external peripheral sections of the joining member 6 are respectively fitted on by an insertion process onto the pivotally attached component such as the folding section of an electronic device, not shown.

INDUSTRIAL APPLICABILITY

A high rotary sliding torque can be obtained by means of an elastic member of weak restoring force according to the invention set forth in any of claims 1 to 9.

According to the invention of claim 2, well-balanced frictional forces are generated at both ends of the elastic member and durability of the rotary cams and fixed cams can be improved without abnormal irregular wear thereof.

According to the invention of claim 3, the number of components can be reduced and costs lowered by using both side faces of one rotary cam or fixed cam as abutment faces.

According to the invention of claim 4, well-balanced frictional forces are generated at both ends of the elastic member while the number of components can be reduced and costs lowered.

According to the invention of claim 5, a click action is generated whereby force is generated that provides pulling in to a prescribed angle within a prescribed angular range or that generates a constant torque in a flat section.

According to the invention of claim 6, the shaft can be stopped at any desired angle.

According to the invention of claim 7, the shaft can be stopped at any desired angle and adhesion with the elastic body is stabilized by making the other face of the rotary cam or fixed cam planar, so a stable energizing force of the elastic member can be obtained without producing irregular loading, no matter what the angle of rotation.

According to the invention of claim 8, a pivotally attached component can be held at any desired angle of rotation by means of a joining plate.

According to the invention of claim 9, arrangement can be achieved substantially in the middle part of the rotary shaft and a stable action ensured by fixing flanges at both ends.

What is claimed is:

1. A single-shaft hinge device comprising a plurality of torque-generating sections wherein a single-shaft hinge comprises a single shaft, rotary cams fitted on the shaft that are capable of axially moving on the shaft and rotating with respect to the shaft about an axis of the shaft, fixed cams fitted on the shaft that are capable of axially moving on the shaft but incapable of relative rotation with respect to the shaft, and elastic members arranged coaxially with the shaft that bring side faces to each adjacent rotary cam and fixed cam into contact to form abutment faces thereof, wherein the abutment faces of the rotary cams and fixed cams are provided at two or more locations on the single shaft.

2. The single-shaft hinge device comprising a plurality of torque-generating sections according to claim 1, wherein a plurality of the rotary cams and fixed cams are arranged coaxially with the shaft so as to abut both ends of the elastic members.

3. The single-shaft hinge device comprising a plurality of torque-generating sections according to claim 1, wherein a plurality of the rotary cams and fixed cams are coaxially arranged on the shaft such that one end of each elastic member abuts a face opposite to the abutment face of the rotary cam or the fixed cam.

4. The single-shaft hinge device comprising a plurality of torque-generating sections according to claim 1, wherein a plurality of the rotary cams and fixed cams are arranged coaxially with the shaft so as to abut both ends of at least of the elastic members and a plurality of the rotary cams and fixed cams are coaxially arranged on the shaft such that one end of each elastic member abuts a face opposite to the abutment face of the rotary cam or the fixed cam.

5. The single-shaft hinge device comprising a plurality of torque-generating sections according to claim 1, wherein there are provided concave/convex sections and flat sections on the abutment faces of the rotary cam and the fixed cam for causing the torque to change in accordance with an angle of rotation.

6. The single-shaft hinge device comprising a plurality of torque-generating sections according to claim 1, wherein a flat face is formed on either one of the rotary cam or the fixed cam or on mutual abutment faces thereof for generating a constant sliding torque irrespective of angle of rotation.

7. The single-shaft hinge device comprising a plurality of torque-generating sections according to claim 1, wherein an abutment face is formed on one side face or both side faces of the rotary cam or the fixed cam.

8. The single-shaft hinge device comprising a plurality of torque-generating sections according to claim 1, which further comprises a bracket fixed to one of the rotary cam or the fixed cam and/or shaft and another bracket fixed to one of the fixed cam and/or shaft or the rotary cam, the one bracket and the other bracket being respectively fixed to a pivotally attached component.

9. The single-shaft hinge device comprising a plurality of torque-generating sections according to claim 1, wherein a joining member is engaged with a co-operating pivotally attached component at both ends of the shaft.

* * * * *